United States Patent [19]

Tobita et al.

[11] Patent Number: 4,846,037
[45] Date of Patent: Jul. 11, 1989

[54] RIGHT ANGLE PROGRESSIVE SHEARING MACHINE

[75] Inventors: Chuo Tobita; Yoshiharu Minato, both of Isehara, Japan

[73] Assignee: Amada Company, Limited, Ishehara, Japan

[21] Appl. No.: 606,845

[22] Filed: May 1, 1984

Related U.S. Application Data

[63] Continuation of Ser. No. 393,503, Jun. 29, 1982, abandoned.

[51] Int. Cl.⁴ .............................................. B26D 1/20
[52] U.S. Cl. ...................................... 83/599; 83/693; 83/917
[58] Field of Search ................. 83/597, 618, 636, 639, 83/688, 693, 694, 917, 916, 598, 599

[56] References Cited

U.S. PATENT DOCUMENTS

| | | | |
|---|---|---|---|
| 1,416,800 | 5/1922 | Detjen | 83/620 |
| 1,447,247 | 3/1923 | Hilsdorf | 83/700 |
| 2,654,428 | 10/1953 | Martincic | 83/696 |
| 2,964,984 | 12/1960 | Schott | 83/698 X |
| 3,205,748 | 9/1965 | Smeets | 83/700 X |
| 3,215,017 | 11/1965 | Rutz | 83/696 |
| 3,568,557 | 3/1971 | Hanni | 83/519 |
| 3,616,719 | 11/1971 | Tassie | 83/917 X |
| 3,691,887 | 9/1972 | Roch | 83/639 X |
| 3,971,281 | 7/1976 | Bredow et al. | 83/636 X |

FOREIGN PATENT DOCUMENTS 1471097  3/1966  France .................... 83/917

OTHER PUBLICATIONS

"Blanking-Center CNC Right-Angle Shear", Strippit Houdaille (brochure).
"Right Angle Blanking Shears", Herr-Voss (brochure).

*Primary Examiner*—Mark Rosenbaum
*Assistant Examiner*—Taylor J. Ross
*Attorney, Agent, or Firm*—Armstrong, Nikaido, Marmelstein & Kubovcik

[57] ABSTRACT

The present invention is directed to a shearing machine which is provided with two pairs of upper and lower blades in a manner such that the upper and lower blades of one pair are connected to the upper and lower blades, respectively, of the other pair at right angles to shear right-angled blanks out of sheet-like workpieces. The two upper blades are connected with each other at a right angle on a ram member in a manner such that their shearing edges are originally inclined downward from their intersecting point to their respective free ends. The ram member carrying the upper blades is connected to the machine frame by means of a pivot means which is horizontally disposed higher than the top level of the lower blades. Also, one of the two pairs of upper and lower blades are located outside of the vertical plane of the outer side of the machine frame together with related parts.

9 Claims, 2 Drawing Sheets

RIGHT ANGLE PROGRESSIVE SHEARING MACHINE

This application is a continuation of application Ser. No. 393,503, filed June 29, 1982.

BACKGROUND OF THE INVENTION

1. Field of the Invention

The present invention relates generally to a shearing machine for cutting or shearing sheet-like workpieces such as sheet metals. More particularly, the present invention pertains to a shearing machine which is provided with two pairs of upper and lower blades in a manner such that the upper and lower of one pair are connected to the upper and lower blades, respectively, of the other pair at right angles to shear right-angled blanks out of sheet-like workpieces.

2. Description of the Prior Art

As is well-known, generally shearing machines for cutting or shearing sheet-like workpieces such as sheet metals are each provided with an elongated movable upper blade carried by a ram member and an elongated fixed lower blade which is fixedly provided under the upper blade to cooperate therewith. The ram member carrying the upper blade is so arranged as to be mechanically or hydraulically moved up and down to bring the upper blade into and out of engagement with the lower blade to cut or shear the workpieces. Also, the ram member is straightly or vertically moved up and down in what is called a guillotine-type shearing machine, and it is swung up and down around a pivot means in what is called a swing-type shearing machine. Generally, the swing-type shearing machines can be manufactured and assembled at lower costs than the guillotine-type shearing machines. Also, the upper blade is so disposed as to be inclined or tilted at an angle that is shear angle to the lower blade so as to decrease the shearing force required. However, too large shear angle of the upper blade to the lower blade will cause the workpieces being sheared to be deformed or twisted.

Heretofore, there have been shearing machines which are each provided with two pair of upper and lower blades in a manner such that the upper and lower blades of one pair are connected to the upper and lower blades, respectively, of the other pair at right angles so as to shear right-angled blanks out of sheet-like workpieces. Such shearing machines have been variously disclosed in U.S. Pat. Nos. 3,215,017; 2,964,984; 2,654,428; 3,205,748; 3,616,719; 1,416,800; 1,447,247 and 3,691,887 for example. In such a shearing machine, the upper blades are mounted at the right angle to each other on a ram member which is movable up and down in a frame having a C-shaped throat into which a workpiece to be sheared is to be fed, while the lower blades are fixedly mounted at the right angle to each other on a portion of the frame. Of course, the arrangement is such that the upper blades are moved up and down by the ram member into and out of engagement with the lower blades to cooperate therewith to shear right-angled blanks out of a workpiece which is fed into the throat.

Heretofore, it has been disadvantageous that the shearing machines each having the two pairs of upper and lower blades as described above are costly in that they are constructed in the guillotine-type manner so that the ram member is straightly or vertically moved up and down. There may have been some shearing machines of the swing-type in which the ram member carrying the two upper blades is swung up and down on a pivot means as has been disclosed in the U.S. Pat. No. 3,691,887 listed above. Indeed, it will be easily thinkable that the ram member carrying the two upper blades can be so arranged as to be swung up and down on a pivot means with one of the two upper blades disposed in parallel with the pivot means and with the other upper blade perpendicular to the pivot means. In this manner, however, it is practically disadvantageous that the shear angle of the upper blade perpendicular to the pivot means will be largely changed and become too large with regard to the mate lower blade since the upper blade perpendicular to the pivot means is rotated around the pivot means as the ram member is swung therearound. Of course, if the shear angle of the upper blade to the lower blade is largely changed and becomes too large during a shearing operation, the upper and lower blades cannot make an accurate shearing action with the result that the workpiece to be sheared will be deformed and twisted. Thus, it must be that there has been no swing-type shearing machine that is capable of making an accurate shearing action to shear right-angled blanks out of sheet-like workpieces, in spite of the fact that the swing-type shearing machines can be manufactured and assembled at lower costs.

Another disadvantage with regard to the conventional shearing machines having two pairs of upper and lower blades has been the fact that a workpiece larger in width than the horizontal depth or length of the throat of the machine frame cannot be sheared. In other words, it has been disadvantageous in the conventional shearing machines that the maximum width of workpieces capable of being sheared is limited to the horizontal depth of the throat formed in the machine frame.

SUMMARY OF THE INVENTION

It is an object of the present invention to provide a swing-type shearing machine having two pairs of upper and lower blades for shearing right-angled blanks out of sheet-like workpieces in which the shear angles of the upper blades to the lower blades can be kept optimum or within limits during a shearing operation.

It is therefore another object of the present invention to provide a swing-type shearing machine having two pairs of upper and lower blades for shearing right-angled blanks out of sheet-like workpieces which is capable of making shearing actions without deforming and twisting workpieces to be sheared.

Accordingly, it is the most important object of the present invention to provide a swing-type shearing machine having two pairs of upper and lower blades for shearing right-angled blanks out of sheet-like workpieces which can be manufactured and assembled at a lower cost but is of good performance.

In order to attain these objects, a shearing machine according to the present invention is so constructed that the two upper blades are connected with each other at a right angle on the ram member in a manner such that their shearing edges are originally inclined downward from their intersecting point to their respective free ends. Also, the ram member carrying the upper blades is pivotally connected to the machine frame by means of a pivot means which is horizontally disposed higher than the top level of the lower blades.

It is a further object of the present invention to provide a swing-type or guillotine-type shearing machine having two pairs of upper and lower blades for shearing right-angled blanks out of sheet-like workpieces in which the maximum width of workpieces that can be sheared is not limited by the machine frame.

It is therefore an object of the present invention to provide a swing-type or guillotine-type shearing machine having two pairs of upper and lower blades for shearing right-angled blanks out of sheet-like workpieces which is of a larger capacity as compared with the size of the machine frame.

In order to attain the immediately above described objects, a shearing machine according to the present invention is so constructed that one of the two pairs of upper and lower blades are located outside of the vertical plane of the outer side of the machine frame together with related parts.

Other and further objects and advantages of the present invention will be apparent from the following description and accompanying drawings which, by way of illustration, show preferred embodiment of the present invention and the principle thereof.

DESCRIPTION OF THE PREFERRED EMBODIMENTS

Figure 1:
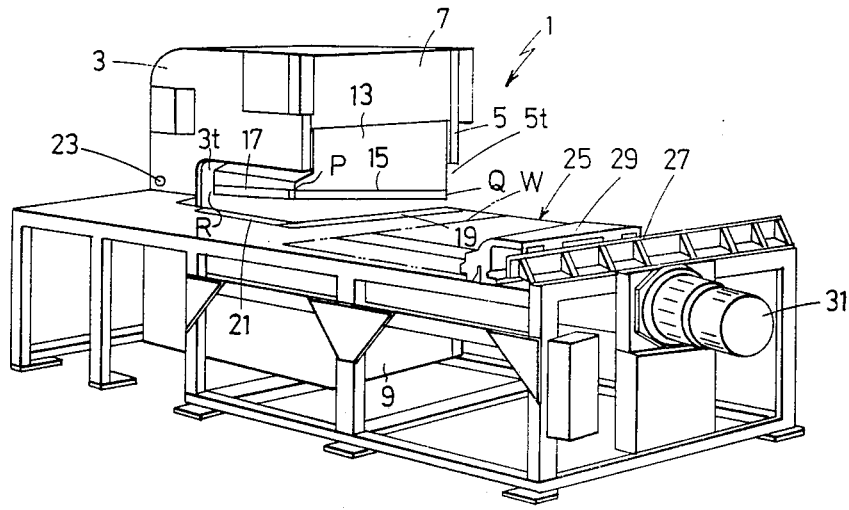
FIG. 1 is a perspective view showing a shearing machine embodying the principles of the present invention.

Referring now to FIG. 1, there is shown a shearing machine 1 which embodies the principles of the present invention as an example. The shearing machine 1 comprises a pair of C-shaped upright plates 3 and 5 which are formed at their midway portions with throats 3t and 5t, respectively, and are connected with each other by an upper front plate 7, a lower front plate 9 and a rear plate 11 shown in FIG. 3 to form a box-like frame. Particularly, the upright plates 3 and 5 are disposed in parallel with each other, and the upper and lower front plates 7 and 9 are fixed to the upper and lower portions, respectively, of the forward ends of the upright plates 3 and 5 at right angles therewith. Also, the throats 3t and 5t of the upright plates 3 and 5 are horizontally formed on a level with each other in such a manner as to extend in parallel with each other and open forwardly about the top of the lower front plate 9.

The shearing machine 1 is provided with a ram 13 carrying an elongated upper front blade 15 and an elongated upper side blade 17, and it is also provided with an elongated lower front blade 19 and an elongated lower side blade 21. The ram 13 is so disposed as to be moved up and down between the upright plates 3 and 5 behind the front upper plate 7 to move the upper front and side blades 15 and 17 up and down, as will be described in great detail hereinafter. The upper front blade 15 is detachably fixed to the forward bottom end of the ram 13 in parallel with the upper front plate 7, and the upper side blade 17 is detachably fixed to the side of the ram 13 in parallel with the upright plate 5. More specifically, the upper front and side blades 15 and 17 are fixed to the ram 13 in such a manner to be integrally connected with each other at a right angle to work as a single L-shaped blade. On the other hand, the lower front blade 19 is detachably and horizontally fixed to the top of the lower front plate 9, and the lower side blade 21 is detachably and horizontally fixed to the throat 3t of the upright plate 3 on a level with the lower front blade 19. In the same manner as the upper front and side blades 15 and 17, the lower front and said blades 19 and 21 are integrally connected with each other so as to work as a single L-shaped blade. Of course, the arrangement is such that the upper front and side blades 15 and 17 will be brought by the ram 13 integrally simultaneously into engagement with the lower front and side blades 19 and 21 to cooperate therewith to make a shearing action when the ram 13 is lowered.

Figure 3:
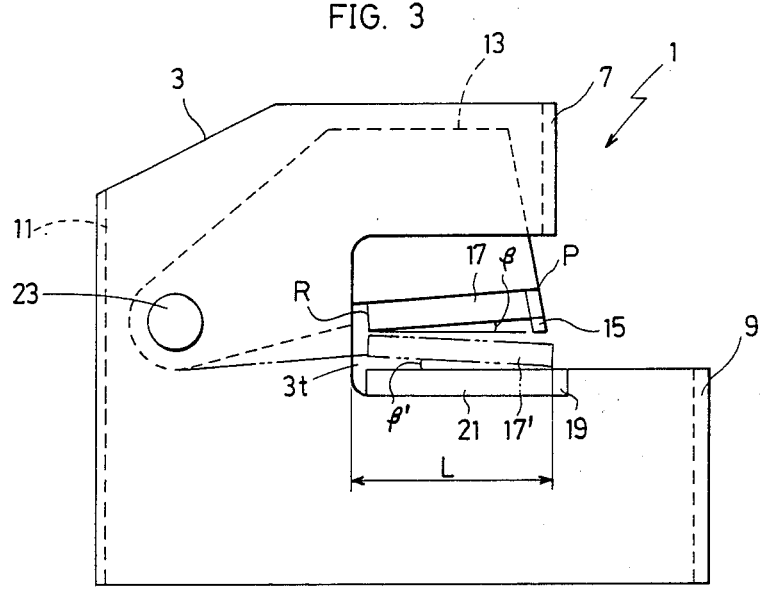
FIG. 3 is a side elevational view showing schematically the important portions of the present invention of the shearing machine shown in FIG. 1.

As shown in FIGS. 1 and 3, the ram 13 is pivotally held on a pivot means 23 such as a shaft held between the upright plates 3 and 5 for the most important purposes of the present invention which will be seen hereinafter as the description proceeds. Also, the pivot means 23 on which the ram 13 is held in disposed higher than the horizontal plane or level of the top surfaces of the lower front and side blades 19 and 21 as shown in FIG. 3. Thus, the ram 13 is so arranged as to be rotated to swung around the pivot means 23 up and down by a drive means (not shown) to move the upper front and side blades 15 and 17 toward and away from the lower front and side blades 19 and 21.

As is shown also in FIG. 1, the shearing machine 1 is provided with a work-table 25 on which a sheet-like workpiece W to be sheared such as a sheet metal is placed to be fed into between the upper front and side blades 15 and 17 and the lower front and side blades 19 and 21 into the throats 3t and 5t of the upright plates 3 and 5. The work-table 25 is so constructed that its top surface is substantially on a level with the top of the lower front and side blades 19 and 21. In order to feed and position the workpiece W to be sheared, the work-table 25 is provided with a first carriage 27 horizontally movable and a second carriage 29 slidably mounted on the first carriage 27 to carry the workpiece W. The first carriage is so arranged as to be horizontally moved by a motor 31 on the work-table 25 toward and away from the lower front and side blades 19 and 21, while the second carriage 29 is so arranged as to be horizontally moved by a motor (not shown) on the first carriage 27 rightward and leftward. Thus, it will be understood that the workpiece W placed on the work-table 25 and held by the second carriage 29 can be fed and positioned anywhere onto the lower front and side blades 19 and 21 by moving the first and second carriages 27 and 29.

In the above described arrangement, the workpiece W can be sheared when it has been positioned onto the lower front and side blades 19 and 21 by the first and second carriages 27 and 29 and the ram 13 is lowered to enable the upper front and side blades 15 and 17 to cooperate with the lower front and side blades 19 and 21. As is readily understood, the workpiece W can be straightly sheared when it is positioned on either of the lower front and side blades 19 and 21, and also it can be sheared into a L-shaped configuration when positioned on both of them. Also, even if the workpiece W is larger in width than the length of the upper and lower front blades 15 and 19 which are mostly longer than the side blades 17 and 21, it can be straightly sheared or slit if it is fed little by little along the upper and lower front blades 15 and 19 for instance with the ram 13 continuously stroked.

Figure 4:
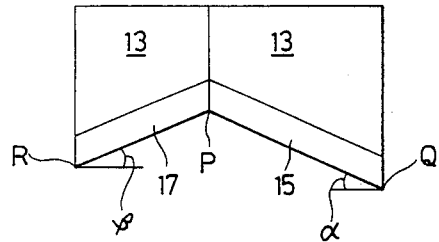
FIG. 4 is a schematic developmental view in which members actually disposed at right angles with each other in the shearing machine shown in FIG. 1 are shown schematically as put together on the same plane.

As best shown in FIG. 4, in which the upper front and side blades 15 and 17 are schematically shown as developed or put together on the same plane, the shearing edges of the upper front and side blades 15 and 17 are so designed as to be inclined at angles $\alpha$ and $\beta$, respectively. More specifically, the shearing edge of the upper front blade 15 is inclined at the angle $\alpha$ in a manner such that its right-hand end Q is lower than the intersecting point P at which the shearing edges of the upper front and side blades 15 and 17 intersect with each other, as shown also in FIGS. 1 and 2 in addition to FIG. 4. Also, as seen from FIGS. 1, 3 and 4, the shearing edge of the upper side blade 17 is inclined at the angle $\beta$ in a manner such that its rear end R is lower than the intersecting point P of the shearing edges of the upper front and side blades 15 and 17. It may be understood that the shearing edges of the front and side blades 15 and 17 are at the angles $\alpha$ and $\beta$, respectively, to the horizontal plane when the ram 13 is so positioned that the flat side of the front upper blade 15 is vertically directed downwardly. Stated otherwise, the shearing edges of the upper front and side blades 15 and 17 are at the angles $\alpha$ and $\beta$, to a plane to which both the plane of the flat side of the upper front blade 15 and the plane of the upper side blade 17 are normal. Thus, the upper front blade 15 is so arranged as to ascend at the shear angle $\alpha$ from the right-hand end Q toward the intersecting point P, and the upper side blade 17 is so designed as to descend at the angle $\beta$ from the intersecting point P toward the rear end R. Accordingly, the angle $\beta$ at which the upper side blade 17 is inclined can be regarded as negative assuming that the shear angle $\alpha$ of the upper front blade 15 is positive. As will be seen hereinafter, the angle $\beta$ of the upper side blade 17 is set negative so that the angle at which the upper side blade 17 is inclined to the lower side blade 21 may be kept within limits without becoming too large when the upper and lower side blades 17 and 21 are in engagement with each other to make a shearing action.

In the above described arrangement, the upper front blade 15 will be kept substantially at the angle $\alpha$ to the horizontal plane wherever the ram 13 is rotated or swung around the pivot means 23. Although strictly the angle $\alpha$ of the upper front blade 15 to the horizontal plane may be changed as the ram 13 is rotated or swung around the pivot means 23, such change can be functionally neglected since the ram 13 is swung up and down on the pivot means 23 around a little angle. Thus, the upper front blade 15 will be brought into engagement with the lower front blade 19 at the angle $\alpha$ to cut into the workpice W at the angle $\alpha$, and therefore the angle $\alpha$ of the upper front blade 15 can be regarded as what is called shear angle.

On the other hand, the upper side blade 17 could not be kept at the angle $\beta$ to the horizontal plane when moved up and down by the ram 13, since the ram 13 is rotated or swung around the pivot means 23 to move the upper side blade 17. Although of course the angle $\beta$ at which the upper side blade 17 is originally inclined on the ram 13 will be always kept unchanged, the angle of the shearing edge of the upper side blade 17 to the horizontal plane will be changed as the ram 13 is rotated or swung around the pivot means 23. Accordingly, the angle $\beta'$ of the shearing edge of the upper side blade 17 to the lower side blade 21 which is shown in FIG. 3 will be changed as the ram 13 is rotated or swung around the pivot means 23 to move the upper side blade 17 up and down. Assuming that angle $\beta'$ of the upper side blade 17 to the lower side blade 21 is negative when the ram 13 is at its raised position, it will be gradually changed or increased from the negative to zero (0) degree and then become positive as the ram 13 is rotated downwardly from the raised position to lower the upper side blade 17. Thus, the angle $\beta'$ of the upper side blade 17 to the lower side blade 21 which is negative when the ram 13 is at the raised position will become positive when the ram 13 is lowered to bring the upper side blade 17 into engagement with the lower side blade 21. It will be understood that the angle $\beta'$ of the upper side blade 17 to the lower side blade 21 will become positive when the ram 13 is lowered, since the pivot means 23 on which the ram 13 is pivotally held is disposed higher than the level of the top surfaces of the lower front and side blades 19 and 21 as has been described hereinbefore. Also, it will be understood that the angle $\beta'$ of the upper side blade 17 to the lower side blade 21 could not become too large but will be kept within limits when the upper and lower side blades 17 and 21 are in engagement with each other to make shearing actions, since the angle $\beta'$ has been originally set to be negative as has been described hereinbefore.

Figure 2:
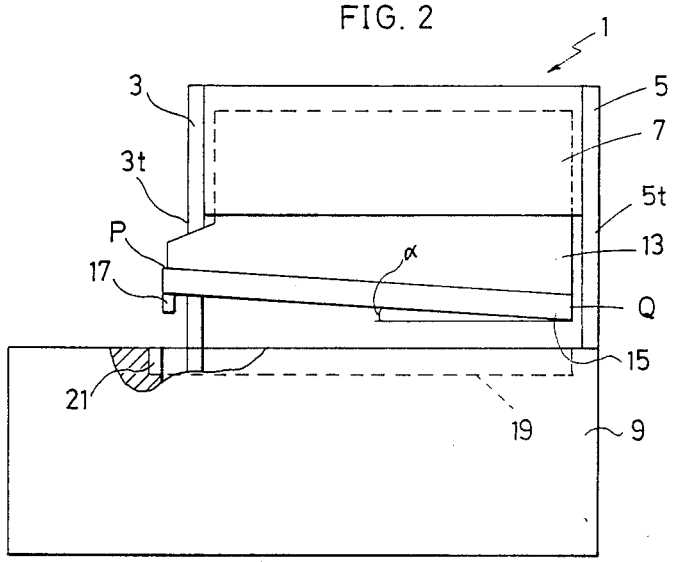
FIG. 2 is a front elevational view showing schematically the important portions of the present invention of the shearing machine shown in FIG. 1.

In operation, the right-hand end Q of the upper front blade 15 will be initially brought into contact with the right-hand end of the workpiece W to be sheared as viewed in FIG. 2 when the ram 13 is downwardly rotated or swung around the pivot means 23. As the ram 13 is further rotated downwardly, the upper front blade 15 will gradually shear the workpiece W leftward from the right-hand end Q to the intersecting point P of the upper front and side blades 15 and 17 in cooperation with the lower front blade 19. It will be understood that the upper front blade 15 will shear the workpiece W in cooperation with the lower front blade 19 at the angle $\alpha$ which is originally set to make the most preferable shearing actions. Also, when the ram 13 is lowered to enable the upper and lower front blades 15 and 19 to finish shearing the workpiece W, of course the intersecting point P of the upper front and side blades 15 and 17 has been brought into contact with the workpiece W. Accordingly, as soon as the upper and lower front blades 15 and 19 has finished shearing the workpiece W, the upper side blade 17 can begin to shear the workpiece W gradually rearwardly from the intersecting point P to the rear end R in cooperation with the lower side blade 21 as the ram 13 is further rotated downwardly on the pivot means 23. Of course, the upper side blade 17 will shear the workpiece W in cooperation with the lower side blade 21 at the angle $\beta'$ which is kept within limits without becoming too large as has been described hereinbefore.

In this connection, the upper and lower side blades 17 and 21 can be made idle so that only the upper and lower front blades 15 and 19 will make shearing actions when the lower limit of the stroke of the ram 13 is set higher in a prior art manner. Thus, even if the workpiece W is larger in width than the length of the upper and lower front blades 15 and 17, it can be straightly sheared or slit when it is fed little by little along the upper and lower front blades 15 and 17 with the ram 13 continuously stroked at a raised position.

As has been described in the above, the angle β' of the upper side blade 17 to the lower side blade 21 will be kept within limits without becoming too large when the upper and lower side blades 17 and 21 are in engagement with each other to shear the workpiece W. Also, the upper front blade 15 will be in engagement with the lower front blade 19 always at the angle α which has been originally set most preferable when shearing the workpiece W. Thus, the workpiece W can be accurately sheared by the upper and lower front blades 15 and 19 and the upper and lower side blades 17 and 21 into blanks without warping and twisting.

Figure 5:
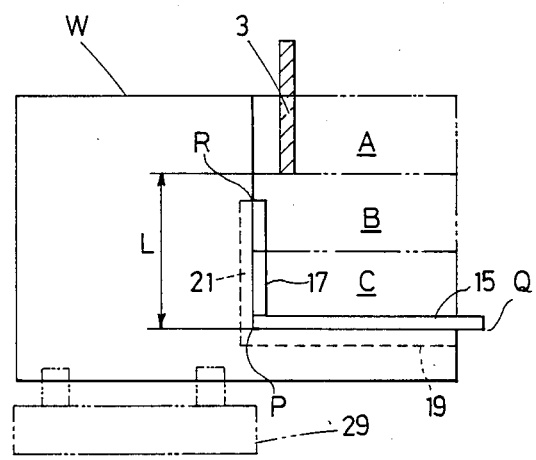
FIG. 5 is a schematic plan view showing the important portions of the present invention of the shearing machine shown in FIG. 1.

Referring to FIGS. 2 and 5, the upper and lower side blades 17 and 21 are so disposed as to be located outside of the vertical plane of the outer side of the upright plate 3. Therefore, the left-hand ends of the upper and lower front blades 15 and 19 which are connected to the upper and lower side blades 17 and 21, respectively, are also arranged as to extend or protrude from the vertical plane of the outer side of the upright plate 3.

In the above described arrangement, the workpiece W can be sheared without being obstructed by the upright plate 3 at the throat 3t thereof, even if it is wider than the horizontal length L of the throats 3t and 5t of the upright plates 3 and 5. Stated otherwise, the workpiece W can be fed rearward of the rear ends of the throats 3t and 5t of the upright plates 3 and 5 to be sheared by the upper and lower front blades 15 and 19 and the upper and lower side blades 17 and 21. For instance, when the workpiece W which is wider than the length L of the throats 3t and 5t of the upright plates 3 and 5 is sheared into A, B and C as shown in FIG. 5, the left-hand portion of the workpiece W can be moved rearward along the outside of the upright plate 3 without being obstructed thereby. It will be understood that the workpiece W is sheared into the blanks A, B and C so that the left-hand remaining portion of the workpiece W can be moved rearward along the outside of the upright plate 3, since the upper and lower side blades 17 and 21 are located outside of the vertical plane of the outer side of the upright plate 3 together with the left-hand ends of the upper and lower front blades 15 and 19.

In this connection, it is to be noted that the purpose of the invention described immediately above can be attained even if the ram 13 is so arranged as to be vertically; moved up and down along vertical guide means instead of being rotated or swung around the pivot means 23. In other words, the upper and lower side blades 17 and 21 can be positioned outside of the vertical plane of the outer side of the upright plate 3 even if the ram 13 is so arranged as to be vertically moved, although the ram 13 has been described hereinbefore as being rotated or swung around the pivot means 23.

Although a preferred form of the present invention has been illustrated and described, it should be understood that the device is capable of modification by one skilled in the art without departing from the principles of the invention. Accordingly, the scope of the invention is to be limited only by the claim appended thereto.

We claim:

1. A shearing machine comprising:
  (a) a frame member having a throat;
  (b) first upper and lower blades and second upper and lower blades, said first upper and lower blades being connected at right angles to said second upper and lower blades, respectively, wherein said first and second upper blades meet or intersect with each other at an intersecting point and said first and second lower blades meet or intersect with each other at an intersecting point;
  (c) ram means carrying said first and second upper blades and movable up and down;
  (d) pivot means for mounting said ram means on said frame member wherein the axis of said pivot means is at a height above said first and second lower blades, and wherein said ram means pivots about said pivot means such that said first and second upper blades are moved between upper and lower positions;
  (e) a progressive shearing edge on each of said first and second upper blades, wherein both said shearing edges are inclined downward from said intersecting point to the other end of each blade at the upper position of the blades and the second upper blade is inclined upward from the intersecting point at the lower position of the blades, and the other end of the first upper blade is lower than the other end of the second upper blade such that the angle of inclination of said first and second upper blades is different, whereby when said first and second upper blades are moved from upper to lower positions said first upper and lower blades cooperate to shear a workpiece prior to said second upper and lower blades cooperating to shear the workpiece.

2. A shearing machine as set forth in claim 1, wherein said first upper and lower blades are substantially in parallel with the axis of said pivot means and said second upper and lower blades are in a plane perpendicular to the axis of said pivot means.

3. A shearing machine as set forth in claims 1 or 2, including a work-table, wherein the first and second lower blades are mounted on said work-table and wherein the shearing edges of said first and second upper blades are inclined from said intersecting point towards said work-table when said ram means is in a raised position.

4. A shearing machine as set forth in claim 1 or 2 including a work-table and a transfer means for transferring a workpiece on said work-table.

5. A shearing machine comprising:
  (a) a frame member having a throat;
  (b) first upper and lower blades and second upper and lower blades, said first upper and lower blades being connected at right angles to said second upper and lower blades, respectively, wherein said first and second upper blades meet or intersect with each other at an intersecting point and said first and second lower blades meet or intersect with each other at an intersecting point, wherein said second upper and lower blades are positioned outside of the outermost portion of said frame member;
  (c) ram means mounted on the frame member, said ram means carrying said first and second upper blades and being movable up and down;
  (d) pivot means for mounting said ram means on said frame member, wherein the axis of said pivot means is at a height above said first and second lower blades, and wherein said ram means pivots about said pivot means such that said first and second upper blades are moved between upper and lower positions; and
  (e) a progressive shearing edge on each of said first and second upper blades, wherein both said shearing edges are inclined downward from said intersecting point to the other end of each blade at the upper position of the blades and the second upper blade is inclined upward from the intersecting point at the lower position of the blades, and the other end of the first upper blade is lower than the other end of the second upper blade such that the angle of inclination of said first and second upper blades is different, whereby when said first and second upper blades are moved from upper to lower positions said first upper and lower blades cooperate to shear a workpiece prior to said second upper and lower blades cooperating to shear the workpiece.

6. A shearing machine as set forth in claim 5, wherein said first upper and lower blades are substantially in parallel with the axis of said pivot means and said second upper and lower blades are in a plane perpendicular to the axis of said pivot means.

7. A shearing machine as set forth in claim 5, including a work-table, wherein the first and second lower blades are mounted on said work-table and wherein the shearing edges of said first and second upper blades are inclined from said intersecting point towards said work-table when said ram means is in a raised position.

8. A shearing machine as set forth in claim 5, including a work-table and a transfer means for transferring a workpiece on said work-table.

9. A shearing machine as set forth in claim 1 or 5 wherein when said second upper blade is in the upper position the end of the second upper blade at the point of intersection is higher than the other end of said second upper blade and when said second upper blade is in the lower position the end of the second upper blade at the point of intersection is lower than the other end of said second upper blade.

* * * * *